G. F. GOERNER.
APPARATUS FOR TREATING FLUIDS.
APPLICATION FILED SEPT. 22, 1917.
1,302,913.
Patented May 6, 1919.
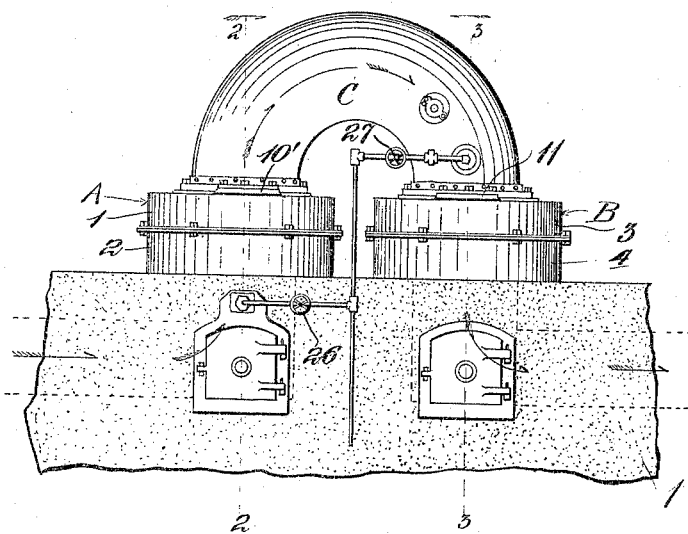
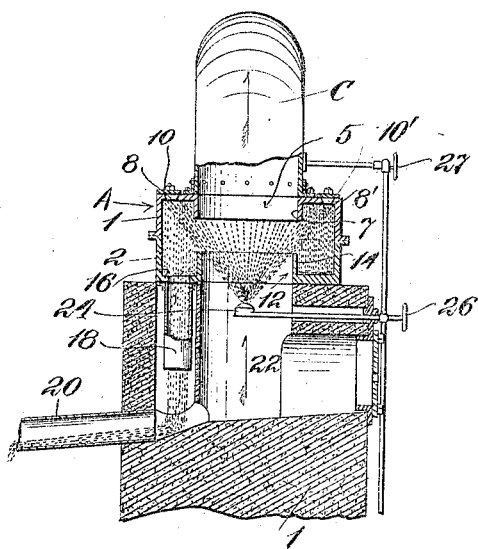
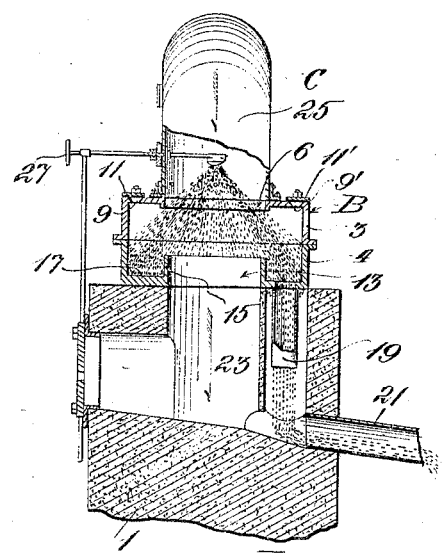
Witnesses:
Inventor:
George F. Goerner,

UNITED STATES PATENT OFFICE.

GEORGE F. GOERNER, OF LOS ANGELES, CALIFORNIA.

APPARATUS FOR TREATING FLUIDS.

1,302,913.  Specification of Letters Patent.  Patented May 6, 1919.

Application filed September 22, 1917. Serial No. 192,810.

*To all whom it may concern:*

Be it known that I, GEORGE F. GOERNER, a citizen of the United States, residing at Los Angeles, county of Los Angeles, and State of California, have invented a certain new and useful Apparatus for Treating Fluids, of which the following is a specification.

This invention relates to apparatus for treating fluids, with the especial end in view of separating therefrom the solid matter carried therein in suspension, precipitating separated substances contained therein, and condensing the gases or vaporous bodies in the fluids under treatment.

In general, my means for effecting the objects above stated, consists in causing the fluid to be treated to pass through a fluid screen, and specifically it consists in interposing in the path of travel of the fluid a treating fluid flowing in a direction at an angle to the flow of the fluid to be treated, whereby to deflect the fluid matter and cause a condensation of the condensable matters, and a separation and precipitation of the solid matters in a zone outside of that traversed by the fluid under treatment, and collecting the resultant products, whether solids or liquids.

I use the term "fluids" throughout the specification and claims in a generic sense as designating any aggregation of molecules, be it smoke, fumes, vapors, dust, steam, mineralogical gases or products, air or the like.

The invention and further objects thereof will appear more fully from the subjoined specification in connection with the accompanying drawing, illustrating one form of apparatus for carrying out my discovery, and the illustration in the drawing may represent a complete apparatus or but a single unit of several conjoined to effect the execution of the steps hereinafter described.

Figure 1 is a front elevation of a unit. Fig. 2 is a section on line 2—2, Fig. 1, and Fig. 3 is a section on line 3—3, Fig. 1.

The apparatus, as shown, consists of two chambers A and B, interconnected by a passageway C and supported on a base of concrete or other suitable material.

Each chamber is composed of two conjoined sections 1 and 2, and 3 and 4 respectively, the upper sections 1 and 3, respectively of each chamber provided with openings 5 and 6 respectively, which register with the openings in the passageway C, and the opening 5 in the section 1, of chamber A formed with a depending baffle flange 7. In each upper section 1 and 3 of the chambers A and B, are hand holes 8 and 8′, and 9 and 9′, respectively, normally closed by covers 10 and 10′, and 11 and 11′, respectively, these holes serving to permit inspection of the interior of the chambers.

The lower sections 2 and 4, respectively, of the chambers A and B, are provided with openings 12 and 13, respectively, formed with channel walls 14 and 15, respectively and with inclined bottoms 16 and 17, respectively, provided with drain pipes 18 and 19, respectively, disposed in said base 1, and arranged to convey the fluids, precipitates and extracted products to discharges 20 and 21, respectively. The openings 12 and 13 of the lower sections 2 and 4 are in line with the openings 5 and 6 of the upper sections 1 and 3, and with passages 22 and 23, respectively provided in said base 1 to convey the fluids, such as fumes, vapors, gases and the like, to be treated, upwardly through the chamber A and downwardly through the chamber B, as hereinafter pointed out.

In the fluids conveying passageway 22 is disposed a nozzle 24 through which a fluid of any desirable nature is discharged in an upwardly direction, but at an angle to the flow of the fluid to be treated. Such fluid may be any capable of effecting extraction, separation or condensation, and may be a liquid, as water.

In the fluid conveying passageway C is disposed a nozzle 25, through which a fluid of any desirable nature, either like the fluid used in chamber A or different therefrom, is discharged in a downwardly direction, but at an angle to the flow of the fluid to be treated.

Valves 26 and 27 respectively control the supply of the fluid to and through the nozzles 24 and 25.

The substance to be treated enters into the passageway 22 and travels upwardly, meeting in its ascent the fluid discharged from the nozzle 24, which deflects the course of travel of the substance and carries it with it to the sides of the chamber A. The precipitates and condensates collect in this chamber A and are eventually carried out through the drain pipe 18 and discharge 20, while the fluid under treatment, with whatever matter, solid or condensible, is still contained therein, passes upwardly through the passageway C, meeting in its descent the downwardly projected body discharge from the nozzle 25, which deflects the fluid or substance under treatment into the sides of the chamber B, wherein further precipitation and condensation is effected, and wherefrom the condensates and precipitates are drawn off through drain pipe 19 and discharge 21.

What I claim is:—

1. An apparatus for treating gases and gaseous bodies to remove therefrom the solids, consisting of a plurality of chambers having collection zones for solids, means interconnecting said chambers and forming a zone of travel for the gases, means for screening the inlet to and the outlet from said zone of travel by respectively an upwardly and outwardly and a downwardly and outwardly directed liquid spray discharging into said collection zones, said last named spray inducing the purified gases through said zone of travel.

2. An apparatus for treating fluids consisting of chambers, means interconnecting said chambers and forming a zone or travel for the gases, said chambers formed with collection zones for solids, means for supplying an upwardly directed spray discharging entirely across the zone of collection and the zone of travel at the entrance to said zone of travel whereby solids are extracted and deposited in said collection zones, and means for supplying a downwardly directed liquid spray across the outlet from the zone of travel and the zone of collection at said outlet to extract the remaining solids and maintain a vacuum within said zone of travel.

In testimony whereof I affix my signature in the presence of a witness.

GEORGE F. GOERNER.

Witness:
  W. H. DUTTON.

Copies of this patent may be obtained for five cents each, by addressing the "Commissioner of Patents, Washington, D. C."